Aug. 15, 1950 — C. H. SPARKLIN — 2,518,503
ELECTRIC IRON

Original Filed May 4, 1945 — 3 Sheets-Sheet 1

Inventor:
Charles H. Sparklin,
By Christen, Schroeder, Merriam & Hofgren,
Attys.

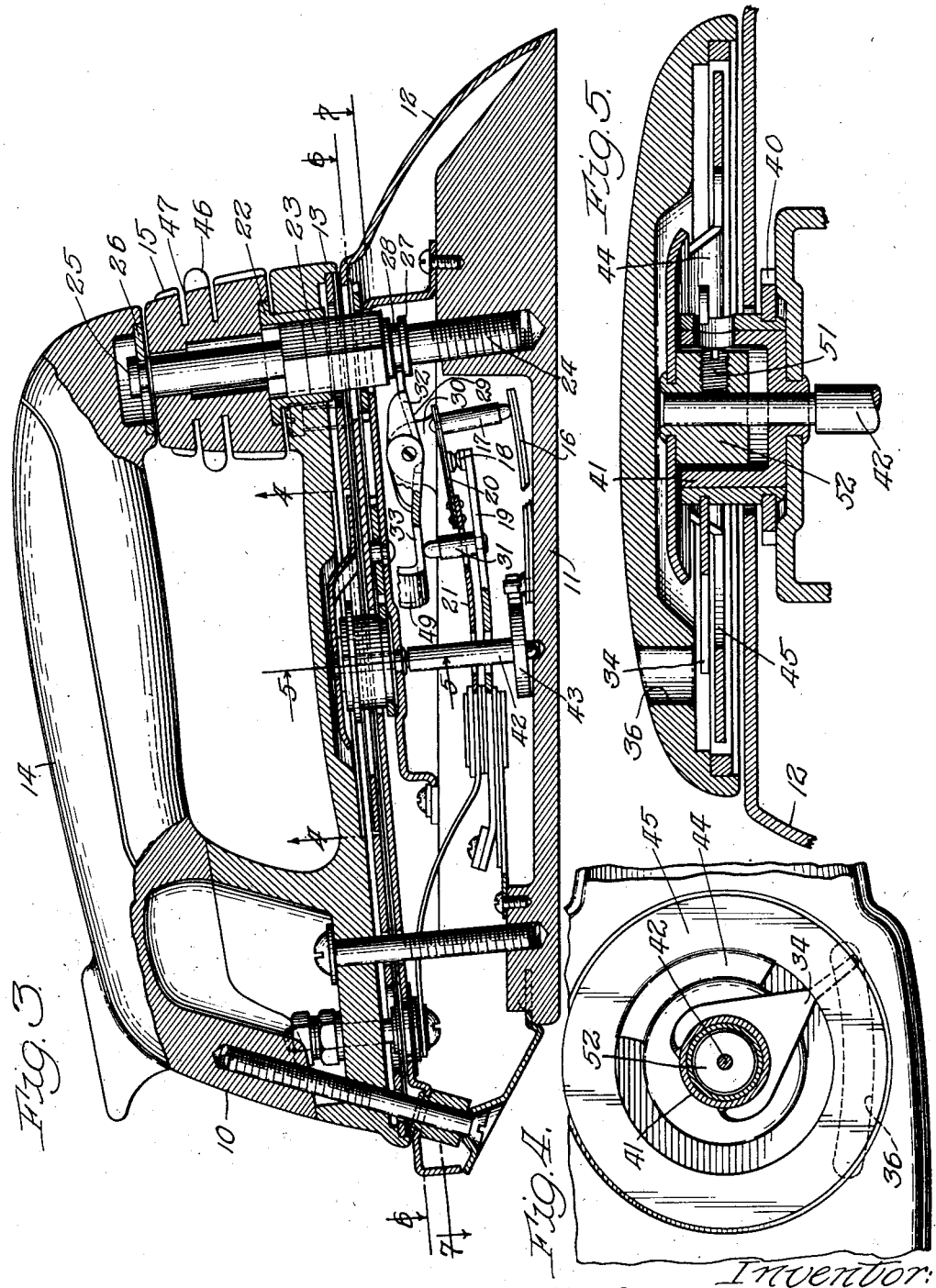

Aug. 15, 1950     C. H. SPARKLIN     2,518,503
ELECTRIC IRON
Original Filed May 4, 1945     3 Sheets-Sheet 3
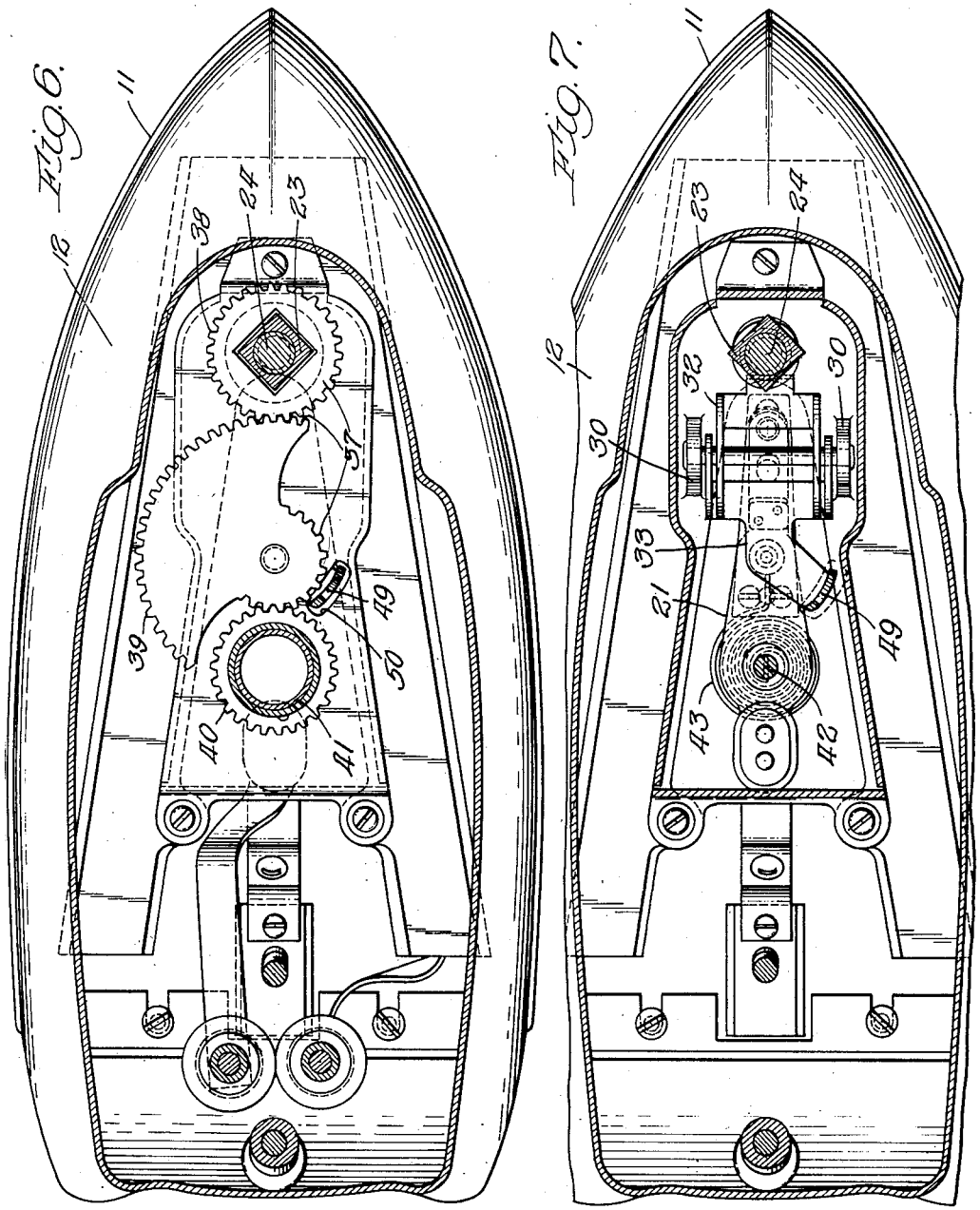
Inventor:
Charles H. Sparklin,
By Chritton, Schroeder, Merriam & Hofgren,
Attys.

Patented Aug. 15, 1950

2,518,503

UNITED STATES PATENT OFFICE 2,518,503

ELECTRIC IRON

Charles H. Sparklin, Chicago, Ill., assignor to Birtman Electric Company, a corporation of Illinois Original application May 4, 1945, Serial No. 591,911. Divided and this application April 24, 1947, Serial No. 743,513

4 Claims. (Cl. 219—25)

This invention relates to a heat regulating iron and more particularly to a sadiron in which heat indicating means are provided for indicating the setting of the thermostat at a point remote from the means of adjusting the same.

This application is a division of my copending application Serial No. 591,911, filed May 4, 1945.

In my copending application, Serial No. 535,645, filed May 15, 1944, now Patent 2,457,185, dated December 28, 1948, a thermostatic adjustment is positioned in a part of the iron convenient to the fingers with the indicia placed with an indicator in a position on the iron convenient to the eye. This application also includes superimposition of the setting indicator and the temperature indicator so that the operator may ascertain at a single glance how the actual temperature of the iron corresponds to the predetermined setting.

In the present invention I have perfected a new iron that provides means for maintaining the finger contacting portion of the heat regulating means in a relatively cool condition. It also provides for sharper control of the temperature by providing a more delicate thermostatic switch. The new iron which is the subject of this invention also has a better balanced construction than that shown by previous irons; it provides for more uniform operating conditions; has cheaper control; and is generally greatly superior to any previous iron of the same general type.

Figure 1:
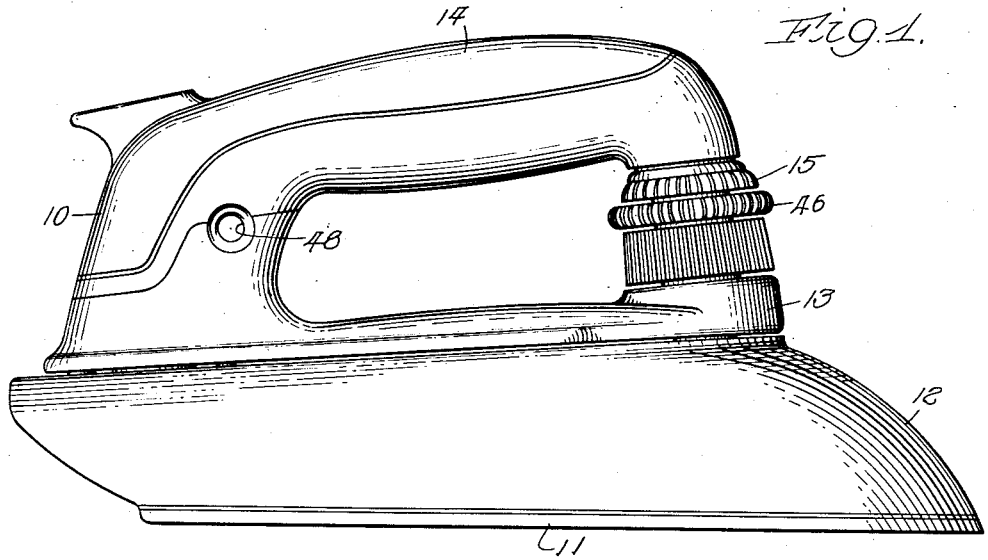
Figure 2:
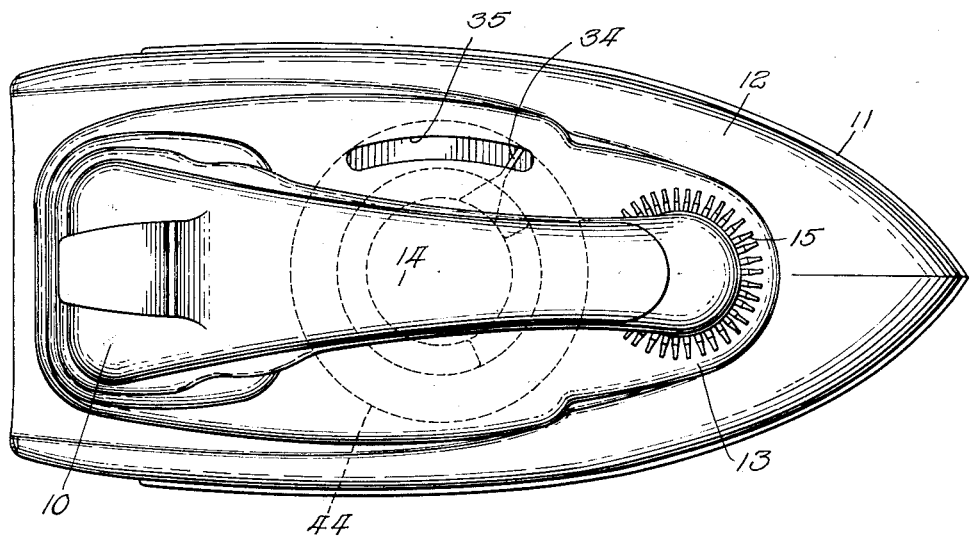

The invention will be described in considerable detail as related to the embodiment of the same set out in the accompanying drawings. Of the drawings, Fig. 1 is a side elevation of an iron embodying the feature of this invention; Fig. 2 is a plan view of the iron of Fig. 1; Fig. 3 is a side elevation, partially in section; Fig. 4 is a section taken along line 4—4 of Fig. 3; Fig. 5 is a section taken along line 5—5 of Fig. 3; Fig. 6 is a section taken along line 6—6 of Fig. 3; and Fig. 7 is a section taken along line 7—7 of Fig. 3.

As shown in the drawings, the iron 10 comprises a sole plate 11 and a hood 12 which together define the body portion of the iron, a handle support 13, a handle 14 containing openings 48 in either side at the rear for positioning of an electric cord, and a control knob 15. The usual form of snap acting thermostat 16 is provided in the body of the iron and is affixed to the sole plate 11. This thermostat may be adjusted by a movement of the post 17. The thermostatic control includes a make and break switch having contact points 18. One of these points is mounted on a section of spring steel 19, while the other point is mounted on a short bimetal thermostatic element 20. This second bimetal element is fastened to another section of spring steel 21. The second bimetal element 20 provides sharper control for the switch for when it is heated it curls downward in opposite direction to that of the first bimetal element 16. This construction results in a thermostatic switch in which very sharp control is provided.

The thermostatic switch is controlled by rotation of the control knob 15 in the following manner. The knob 15 has a central opening in which an internal sleeve 22 is anchored. Within this sleeve is a square nut 23 which is thus turned by turning of the knob 15. This nut contains a threaded post 24 which is rotatably journaled in the sole plate at its bottom and which has a head 25 fastened within a plate 26 in the handle.

The square nut 23 is provided at its base with a collar 27 having a groove 28. A broken rocker arm 29 is pivotally mounted in a bracket 30. This rocker arm is engaged at its front end by the sides of the groove 28. The other end of the rocker arm bears against a post 31 that is fastened to the lower spring steel arm 19 which carries a contact point 18 for the make and break switch. Thus the post 31 serves to position the switch relative to the first bimetal thermostat element 16. The broken rocker arm 29 is constructed so that it acts as a rocker arm in one direction only. This is provided for by having the rocker arm in two sections, each mounted on the same pivot, but with the front section 32 terminating around the rocker in a yoke, the ends of which bear upon the top of the rear section 33 of the rocker arm. The positioning of the rocker arm positions the switch relative to the first bimetal thermostat element 16 which controls the temperature at which the iron operates. This positioning is accompanied by rotation of the knob 15. When the knob 15 is rotated, the square nut 23 is moved up or down on the post 24. This moves the collar 27 and thus positions the rocker arm 29 which operates as a rocker only when the collar 27 moves upwardly.

When the collar is moved in a downward direction, the rear of the rocker arm is kept in proper position by means of the spring steel section 19 pushing against the rocker arm through post 31. Such a construction is provided so that the rear portion 33 of the rocker arm may serve as a lever fulcrumed at one end around the rocker arm pivot. It functions as a lever when the free end of the rear portion is pushed down. The purpose of this construction will be explained in greater detail hereinafter.

The setting of the thermostat is shown by the indicator 34, the end of which points to the indicia 35 mounted below the handle. The end of the indicator 34 appears through an arcuate opening 36 in the body of the iron. In the particular form shown, this opening also passes through the handle support 13, the indicator 34 is operated simultaneously with the setting of the thermostat by means of a gear train 37 connected to the square nut 23. A ring gear 38 having a square central opening is slidably mounted on the square nut 23 and meshes with the larger circumference of a flat ring reducing gear 39. The smaller circumference of the gear meshes with a toothed arcuate member 40 attached to the mounting 41 that bears the indicator 34. This mounting 41 is concentric with the shaft 42 and is designed to turn independently of the shaft.

The temperature indicator preferably comprises a thermostatic coil 43 secured to the sole plate 11 of the iron in a central location. This coil may be a conventional bimetal material in spiral shape adapted to expand and contract as it heats and cools. At the inner end of the coil there is located a post 42 that is rotatable under the influence of the bimetal coil. The base of the post 42 is rotatably journaled in the sole plate. As a result when the temperature of the sole plate rises, the coil expands and turns the shaft. The temperature indicating means 44 is secured to the neck of the shaft 42 and rotates therewith. This means comprises a ring 45 having its circumferential portion underlying the opening 36 and the point of the setting indicator 34. The ring may be painted appropriately, for example, with a red zone, a yellow zone, and a green zone, and is also marked so that whenever the yellow zone underlies the temperature setting the temperature of the iron is the temperature indicated. On the other hand when the red zone underlies the setting indicator, the temperature of the iron will be above that required for a particular operating condition, and when the green zone underlies the pointer, the temperature of the iron will be below that suitable for the preferred operating conditions. This method of marking and the way in which the setting indicator and the thermometer may be calibrated is explained in detail in my copending application referred to hereinabove.

On the rear section 33 of the broken rocker arm there is mounted an upwardly extending arm 49 carrying at its top an inclined plate 50 (Figure 7). The upwardly extending portion is located so that when the control knob 15 is turned to a position corresponding to a high temperature the larger circumference of the ring reducing gear 39 contacts the inclined plate 50 and pushes it down, thereby preventing locking of the parts. This serves to push the rear section 33 of the broken rocker arm down and break the contact of the control switch. It can be seen that when the rear portion of the broken rocker arm is used in the above manner it acts as a lever fulcrumed at the point of pivot of the broken rocker arm.

After the new iron has been built and before it has been put in operation, it should be synchronized so that the temperature indicator will coincide with the thermostat setting. This can conveniently be done by means of a headless screw 51 positioned in the hub 52 of the temperature indicating means 44. The screw presses against post 42 that is attached to the bimetal thermostat 43 after the parts have been synchronized.

The knob 15 which is used to control the operating temperature of the iron, has a finger contacting portion 46 extending beyond the main body portion of the knob. This extended portion is separated from the rest of the knob by deep circular grooves 47 on either side which serve to keep the finger contacting portions 46 cool.

The broken rocker arm 29 and its function are shown and described and claimed in my copending application Serial No. 700,957, filed October 3, 1946.

The foregoing detailed description has been given for clearness of understanding only, and no unnecessary limitation should be understood therefrom.

I claim:

1. In an electric iron having a body portion and an electric heating element to receive heat therefrom, a bimetal thermostat element in the body adjacent the heating element, a switch in the electrical circuit to said heating element and including a pair of cooperating contact members, a pair of arms in said electrical circuit each carrying a contact member also in said circuit, a second bimetal thermostat element forming a part of one of said arms and in said electrical circuit, and a linkage means located beyond said contact points and extending between said first bimetal thermostat element and one of said arms for causing separation of said contact members at a predetermined temperature, said first bimetal thermostat element curling away from said heating element when heated and said second bimetal element curling toward said heating element when heated by electricity passing therethrough to increase the speed of separation of said contact members when the bimetal elements are subjected to heat.

2. The electric iron of claim 1 wherein one of said contact members is mounted on said second bimetal thermostat element.

3. In an electric iron having a body portion and an electric heating element, a bimetal thermostat element having one end mounted in close proximity with the heating element and the other end arranged to curl away from the heating element under the influences of heat, a mounting member spaced from said bimetal, a contact arm having one end held in said mounting member, a contact member on the other end of said arm and arranged on the side thereof opposite said bimetal, a second mounting member located on the side of said first mounting member that is opposite said bimetal, a flexible contact arm having one end held in said second mounting member and arranged alongside said first contact arm, a second bimetal thermostat element having one end attached to the other end of said flexible contact arm and the other end of the second bimetal extending beyond the corresponding end of said first contact arm, said second bimetal having said other end arranged to curl toward the first contact arm and said first bimetal under the influence of heat, a contact member mounted on said second bimetal and intermediate the ends thereof for cooperative contact with said first contact member, said contact members being arranged in the electrical circuit to said heating element, and a post member mounted on the outer end of one of said bimetal elements and bearing against the outer end of the other bimetal element for causing relative movement of said bimetal elements away from each other and separation of said contact members when said bimetal elements are subjected to heat.

4. In an electric iron having a body portion and an electric heating element, a bimetal thermostat element in the body adjacent the heating element, a switch in the electrical circuit to said heating element and including a pair of cooperating contact members, a pair of arms each carrying a contact member, a second bimetal thermostat element forming a part of one of said arms, and a linkage means between said first bimetal thermostat element and one of said arms for causing separation of said contact members at a predetermined temperature, said bimetal thermostat elements serving to increase the speed of separation of said contact members when the bimetal elements are subjected to heat, one of said contact members being mounted on said second bimetal thermostat element at a point spaced inwardly from the outer end of said element, and said linkage means being attached to said second bimetal thermostat element at a point adjacent said outer end, both said bimetal thermostat elements being arranged to curl inwardly toward each other under the influence of heat.

CHARLES H. SPARKLIN.

REFERENCES CITED

The following references are of record in the file of this patent:

UNITED STATES PATENTS

| Number | Name | Date |
| --- | --- | --- |
| 1,606,037 | Myers | Nov. 9, 1926 |
| 1,962,587 | Getchell | June 12, 1934 |
| 2,127,083 | Howe | Aug. 16, 1938 |
| 2,235,479 | Gough | Mar. 18, 1941 |
| 2,270,736 | Kuhn et al. | Jan. 20, 1942 |
| 2,353,151 | Elsenheimer | July 11, 1944 |
| 2,403,115 | Olving | July 2, 1946 |
| 2,422,526 | Burch | June 17, 1947 |
| 2,427,945 | Clark et al. | Sept. 23, 1947 |

FOREIGN PATENTS

| Number | Country | Date |
| --- | --- | --- |
| 558,735 | Great Britain | Jan. 18, 1944 |

Certificate of Correction

Patent No. 2,518,503 August 15, 1950

CHARLES H. SPARKLIN

It is hereby certified that error appears in the printed specification of the above numbered patent requiring correction as follows:

Column 4, lines 29 and 30, strike out the words "to receive heat therefrom" and insert the same in line 31, after "element" and before the comma;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*